United States Patent
Tsudik

(10) Patent No.: US 9,086,796 B2
(45) Date of Patent: Jul. 21, 2015

(54) FINE-TUNING AN OPERATION BASED ON TAPPING

(71) Applicant: Apple Inc., Cupertino, CA (US)

(72) Inventor: Maxim Tsudik, Herziliya (IL)

(73) Assignee: APPLE INC., Cupertino, CA (US)

( * ) Notice: Subject to any disclaimer, the term of this patent is extended or adjusted under 35 U.S.C. 154(b) by 176 days.

(21) Appl. No.: 13/734,852

(22) Filed: Jan. 4, 2013

(65) Prior Publication Data

US 2014/0194163 A1 Jul. 10, 2014

(51) Int. Cl.
*G06F 3/0488* (2013.01)
*G06F 1/16* (2006.01)

(52) U.S. Cl.
CPC ............ *G06F 3/0488* (2013.01); *G06F 1/1694* (2013.01); *G06F 2200/1636* (2013.01); *G06F 2200/1637* (2013.01)

(58) Field of Classification Search
CPC ..... G06F 3/017; G06F 1/1643; G06F 3/0488; G06F 3/0416; H04M 1/233
USPC ....................................................... 455/566
See application file for complete search history.

(56) References Cited

U.S. PATENT DOCUMENTS

| | | | |
|---|---|---|---|
| 7,966,084 B2 | 6/2011 | Bengtsson et al. | |
| 8,212,790 B2 | 7/2012 | Rimas-Ribikauskas et al. | |
| 8,291,350 B1 * | 10/2012 | Park et al. | 715/863 |
| 8,493,342 B2 * | 7/2013 | Park et al. | 345/173 |
| 8,654,524 B2 | 2/2014 | Pance et al. | |
| 2006/0238517 A1 | 10/2006 | King et al. | |
| 2008/0150902 A1 | 6/2008 | Edpalm et al. | |
| 2008/0259046 A1 * | 10/2008 | Carsanaro | 345/173 |
| 2009/0109182 A1 | 4/2009 | Fyke et al. | |
| 2009/0239581 A1 | 9/2009 | Lee | |
| 2010/0194682 A1 | 8/2010 | Orr et al. | |
| 2010/0256947 A1 | 10/2010 | Kim et al. | |
| 2010/0313126 A1 | 12/2010 | Jung et al. | |

(Continued)

FOREIGN PATENT DOCUMENTS

EP 2214093 A1 8/2010
EP 2 302 881 A1 3/2011

OTHER PUBLICATIONS

Office Action received in U.S. Appl. No. 13/734,839, dated Jan. 16, 2015, 20 pages.

(Continued)

*Primary Examiner* — Christian Hannon
(74) *Attorney, Agent, or Firm* — Morgan, Lewis & Bockius LLP

(57) ABSTRACT

A mobile device enables the performance of an operation, which can be performed with only coarse granularity using a touchscreen, to be performed with finer granularity in response to detection of stimulus via mechanisms other than the touchscreen. For example, the mobile device can use its sensors (e.g., accelerometer, gyroscope, etc.) to detect a tapping motion against a non-touchscreen surface of that mobile device. In response to detecting such physical interaction, the mobile device can perform the operation with a level of precision that cannot be achieved when the performance of the operation is attempted via interaction with the touchscreen. The level of granularity of performance can vary with the interaction's force. For example, a tap performed with lesser force can cause a displayed object to move one pixel, while a tap performed with greater force can cause that displayed object to move five pixels.

24 Claims, 9 Drawing Sheets

(56) References Cited

U.S. PATENT DOCUMENTS

| | | |
|---|---|---|
| 2011/0087454 A1 | 4/2011 | Lee et al. |
| 2011/0113380 A1 | 5/2011 | Sakalowsky et al. |
| 2012/0013539 A1 | 1/2012 | Hogan et al. |
| 2012/0249595 A1 | 10/2012 | Feinstein |
| 2013/0057489 A1 | 3/2013 | Morton et al. |
| 2013/0344919 A1* | 12/2013 | Kim et al. ............... 455/566 |
| 2014/0071069 A1 | 3/2014 | Anderson et al. |
| 2014/0143738 A1 | 5/2014 | Underwood, IV et al. |
| 2014/0168057 A1* | 6/2014 | Ahuja et al. ............. 345/156 |
| 2014/0194162 A1 | 7/2014 | Tsudik |
| 2014/0194163 A1 | 7/2014 | Tsudik |
| 2014/0195987 A1 | 7/2014 | Tsudik |
| 2014/0319232 A1 | 10/2014 | Gourlay et al. |

OTHER PUBLICATIONS

Office Action received in U.S. Appl. No. 13/734,845, dated Oct. 23, 2014, 20 pages.
Final Office Action received in U.S. Appl. No. 13/734,845, dated Feb. 24, 2015, 17 pages.

* cited by examiner

FINE-TUNING AN OPERATION BASED ON TAPPING

BACKGROUND

The present disclosure relates generally to mobile devices, and in particular to techniques for manipulating mobile device user interfaces based on user interactions with those mobile devices.

A mobile device (also known as a handheld device, handheld computer, or simply handheld) can be a small, hand-held computing device, typically having a display screen with touch input and/or a miniature keyboard. A handheld computing device has an operating system (OS), and can run various types of application software, sometimes called "apps." Most handheld devices can also be equipped with Wi-Fi, Bluetooth, and global positioning system (GPS) capabilities. Wi-Fi components can allow wireless connections to the Internet. Bluetooth components can allow wireless connections to other Bluetooth capable devices such as an automobile or a microphone headset. A camera or media player feature for video or music files can also be typically found on these devices along with a stable battery power source such as a lithium battery. Mobile devices often come equipped with a touchscreen interface that acts as both an input and an output device.

Mobile phones are a kind of mobile device. A mobile phone (also known as a cellular phone, cell phone, or hand phone) is a device that can make and receive telephone calls over a radio link while moving around a wide geographic area. A mobile phone can do so by connecting to a cellular network provided by a mobile phone operator, allowing access to the public telephone network. In addition to telephony, modern mobile phones can often also support a wide variety of other services such as text messaging, multimedia messaging service (MMS), e-mail, Internet access, short-range wireless communications (infrared, Bluetooth, etc.), business applications, gaming, and photography. Mobile phones that offer these and more general computing capabilities are often referred to as smart phones.

The Apple iPhone, in its various generations, is a smart phone. The iPhone includes a variety of components, such as a GPS, an accelerometer, a compass, and a gyroscope, which the iPhone's OS can use to determine the iPhone's current location, orientation, speed, and attitude. The iPhone's OS can detect events from these components and pass these events on to applications that are executing on the iPhone. Those applications can then handle the events in a manner that is custom to those applications. For example, using its built-in components, the iPhone can detect when it is being shaken, and can pass an event representing the shaking on to applications that have registered to listen for such an event. An application can respond to that event, for example, by changing the images that the iPhone is currently presenting on its touchscreen display.

Like many mobile devices, the iPhone, and its cousins the iPad and iPod Touch, come equipped with a touchscreen interface that can detect physical contact from a user of the mobile device and generate a corresponding event. For example, the iPhone can detect when a user has single-tapped the screen, double-tapped the screen, made a pinching motion relative to the screen, made a swiping motion across the screen, or made a flicking motion on the screen with his fingertips. Each such user interaction relative to the iPhone can cause a different kind of corresponding event to be generated for consumption by interested applications. Thus, the iPhone, iPad, and iPod Touch are able to detect and respond to a variety of physical interactions that a user can take relative those devices.

A mobile device's touchscreen is usually the primary mechanism by which the mobile device's user interacts with user interface elements (e.g., icons) that are displayed on the touchscreen. Thus, if a user desires to launch an application, the user might tap on the application's icon shown on the mobile device's display. Alternatively, if a user desires to move an icon from one location to another in the user interface, the user might press down on that icon's location on the display and then slide his fingertip across the touchscreen to the destination at which the user wants the icon to be placed. A user of a more conventional computer, such as a desktop computer, would likely use a separate pointing device such as a mouse to perform similar operations. Although both mechanisms work for manipulating user interface elements shown on a display, pointing devices, such as a mouse, often permit more refined movements and manipulations relative to those user interface elements than does a finger against a small touchscreen. The lack of ability to make highly refined selections relative to a mobile device's touchscreen arises largely from the relatively large contact area that the user's fingertip makes against the touchscreen. The lack of ability to make such highly refined selections is also a consequence of the user's fingertip obscuring much of the portion of the display that contains the user interface element with which the user wants to interact. User interface element manipulations performed via touchscreen can therefore be somewhat inaccurate. It can be very difficult for a user to select a desired pixel on the mobile device's display.

BRIEF DESCRIPTION

DETAILED DESCRIPTION

Figure 1:
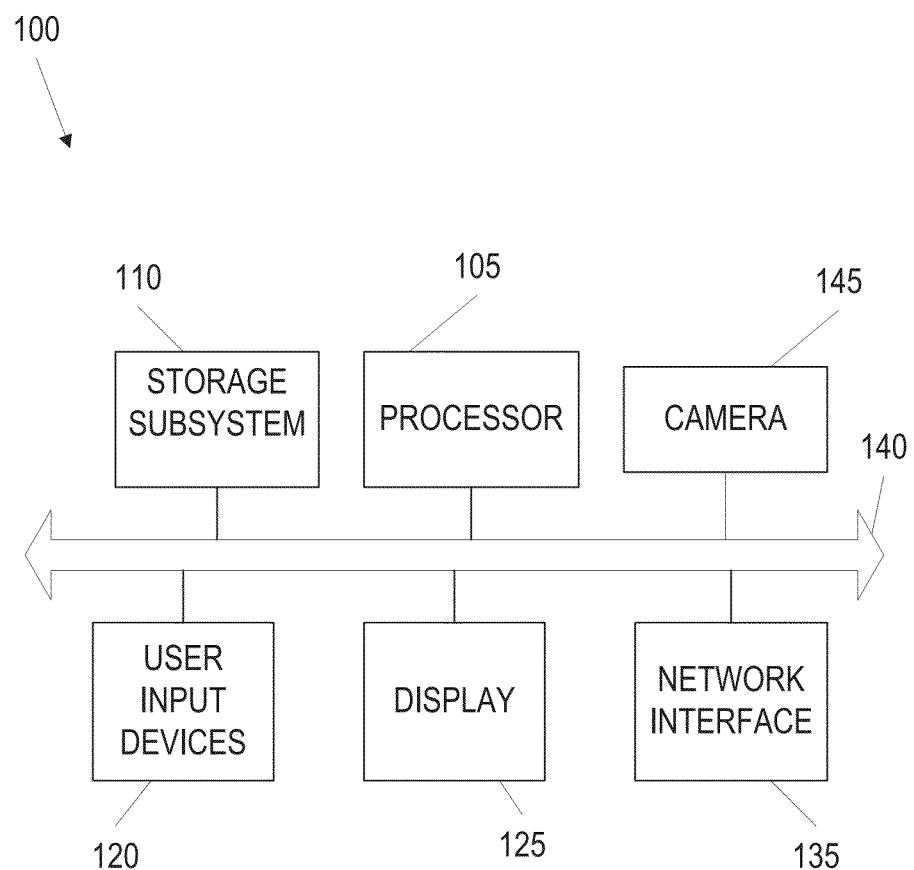
FIG. 1 is a block diagram of a computer system according to an embodiment of the present invention.

According to one embodiment of the invention, a mobile device enables refined manipulations of virtual objects (e.g., icons) shown on its display by detecting and responding to a user's tapping actions relative to the sides (or any surfaces other than the touchscreen) of the mobile device. The mobile device can move the virtual object by a relatively small increment in a direction opposite the surface against which the mobile device has detected the tapping, as though the tapping were gently nudging the virtual object away from the tapped surface. For example, if the user taps on the right side of the mobile device, then the mobile device can responsively move a currently selected virtual object left on the display by one pixel. Conversely, if the user taps on the left side of the mobile device, then the mobile device can responsively move the currently selected virtual object right on the display by one pixel. Similar movements of similar magnitude and in expected directions can be achieved by tapping the top or bottom of the mobile device. Thus, a currently selected virtual object can be moved in a more refined and precise manner than might be possible using a touchscreen alone.

According to one embodiment of the invention, a mobile device enables refined adjustments of selections of items (e.g., text characters) shown on its display by detecting and responding to a user's tapping actions relative to the sides (or any surfaces other than the touchscreen) of the mobile device. In response to a user tapping on the side of the mobile device, the mobile device can alter the scope of the selection by a specified fine magnitude in an expected direction. For example, if the user has selected a block of text having a left-most selection boundary and a right-most selection boundary, then the mobile device can first respond to the user's touching of one of those boundaries by making that boundary (either the left-most or right-most) the currently "active" boundary, and then respond to the user's tapping on a side of the mobile device by moving the currently active boundary one text character away from the tapped side, thereby causing one more or one less (depending on the active boundary and the direction) text character to be included within the selected text. Using this technique, the mobile device's user can more easily refine the scope of the selected items to include slightly more or slightly fewer items.

According to one embodiment of the invention, a mobile device enables the performance of an operation, which can be performed at only a relatively coarse granularity using the touchscreen of the mobile device, to be performed at a relatively fine granularity in response to the mobile device's detection of stimulus via mechanisms other than the mobile device's touchscreen. For example, the mobile device can use its sensors (e.g., accelerometer, gyroscope, etc.) to detect physical interaction (e.g., a tapping motion) relative to some surface of the mobile device other than its touchscreen. In response to detecting such physical interaction, the mobile device can perform the operation with a level of precision that cannot be achieved when the performance of the operation is attempted via interaction with the touchscreen. Furthermore, in one embodiment of the invention, the level of granularity at which the operation is performed can be dependent upon the strength or force of the detected physical interaction. For example, a tap performed with a lesser degree of force can cause a displayed object to move one pixel on the screen, while a tap performed with a greater degree of force can cause that displayed object to move five pixels on the screen.

The following detailed description together with the accompanying drawings will provide a better understanding of the nature and advantages of the present invention.

Certain embodiments of the invention enable a mobile device to perform more fine-tuned operations relative to displayed graphical objects that are ordinarily possible to perform using only a fingertip against a touchscreen. For example, if the finest granularity at which an operation can be performed using only a fingertip against a touchscreen is at ten pixels, then embodiments of the invention can enable the same operation to be performed at a granularity of less than ten pixels. In an embodiment of the invention, the mobile device enables the performance of this reduced-granularity operation in response to a physical stimulus of the mobile device, such as the tapping of the mobile device on its sides (or some surface of the mobile device other than its touchscreen). The mobile device can use its sensors to detect such physical stimulus and respond by performing the operation with enhanced precision (e.g., one pixel). The granularity at which the operation is performed can be based at least in part on the detected force or magnitude of the physical stimulus, such that increased force produces reduced granularity.

FIG. 1 illustrates a computing system 100 according to an embodiment of the present invention. Computing system 100 can be implemented as any of various computing devices, including, e.g., a desktop or laptop computer, tablet computer, smart phone, personal data assistant (PDA), or any other type of computing device, not limited to any particular form factor. Computing system 100 can include processing unit(s) 105, storage subsystem 110, input devices 120, display 125, network interface 135, and bus 140. Computing system 100 can be an iPhone or an iPad.

Processing unit(s) 105 can include a single processor, which can have one or more cores, or multiple processors. In some embodiments, processing unit(s) 105 can include a general-purpose primary processor as well as one or more special-purpose co-processors such as graphics processors, digital signal processors, or the like. In some embodiments, some or all processing units 105 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 105 can execute instructions stored in storage subsystem 110.

Storage subsystem 110 can include various memory units such as a system memory, a read-only memory (ROM), and a permanent storage device. The ROM can store static data and instructions that are needed by processing unit(s) 105 and other modules of computing system 100. The permanent storage device can be a read-and-write memory device. This permanent storage device can be a non-volatile memory unit that stores instructions and data even when computing system 100 is powered down. Some embodiments of the invention can use a mass-storage device (such as a magnetic or optical disk or flash memory) as a permanent storage device. Other embodiments can use a removable storage device (e.g., a floppy disk, a flash drive) as a permanent storage device. The system memory can be a read-and-write memory device or a volatile read-and-write memory, such as dynamic random access memory. The system memory can store some or all of the instructions and data that the processor needs at runtime.

Storage subsystem 110 can include any combination of computer readable storage media including semiconductor memory chips of various types (DRAM, SRAM, SDRAM, flash memory, programmable read-only memory) and so on. Magnetic and/or optical disks can also be used. In some embodiments, storage subsystem 110 can include removable storage media that can be readable and/or writeable; examples of such media include compact disc (CD), read-only digital versatile disc (e.g., DVD-ROM, dual-layer DVD-ROM), read-only and recordable Blu-Ray® disks, ultra density optical disks, flash memory cards (e.g., SD cards, mini-SD cards, micro-SD cards, etc.), magnetic "floppy" disks, and so on. The computer readable storage media do not include carrier waves and transitory electronic signals passing wirelessly or over wired connections.

In some embodiments, storage subsystem 110 can store one or more software programs to be executed by processing unit(s) 105. "Software" refers generally to sequences of instructions that, when executed by processing unit(s) 105 cause computing system 100 to perform various operations, thus defining one or more specific machine implementations that execute and perform the operations of the software programs. The instructions can be stored as firmware residing in read-only memory and/or applications stored in magnetic storage that can be read into memory for processing by a processor. Software can be implemented as a single program or a collection of separate programs or program modules that interact as desired. Programs and/or data can be stored in non-volatile storage and copied in whole or in part to volatile working memory during program execution. From storage subsystem 110, processing unit(s) 105 can retrieves program instructions to execute and data to process in order to execute various operations described herein.

A user interface can be provided by one or more user input devices 120, display device 125, and/or and one or more other user output devices (not shown). Input devices 120 can include any device via which a user can provide signals to computing system 100; computing system 100 can interpret the signals as indicative of particular user requests or information. In various embodiments, input devices 120 can include any or all of a keyboard, touch pad, touch screen, mouse or other pointing device, scroll wheel, click wheel, dial, button, switch, keypad, microphone, and so on.

Display 125 can display images generated by computing system 100 and can include various image generation technologies, e.g., a cathode ray tube (CRT), liquid crystal display (LCD), light-emitting diode (LED) including organic light-emitting diodes (OLED), projection system, or the like, together with supporting electronics (e.g., digital-to-analog or analog-to-digital converters, signal processors, or the like). Some embodiments can include a device such as a touchscreen that function as both input and output device. In some embodiments, other user output devices can be provided in addition to or instead of display 125. Examples include indicator lights, speakers, tactile "display" devices, printers, and so on.

In some embodiments, the user interface can provide a graphical user interface, in which visible image elements in certain areas of display 125 are defined as active elements or control elements that the user can select using user input devices 120. For example, the user can manipulate a user input device to position an on-screen cursor or pointer over the control element, then click a button to indicate the selection. Alternatively, the user can touch the control element (e.g., with a finger or stylus) on a touchscreen device. In some embodiments, the user can speak one or more words associated with the control element (the word can be, e.g., a label on the element or a function associated with the element). In some embodiments, user gestures on a touch-sensitive device can be recognized and interpreted as input commands; these gestures can be but need not be associated with any particular array in display 125. Other user interfaces can also be implemented.

Network interface 135 can provide voice and/or data communication capability for computing system 100. In some embodiments, network interface 135 can include radio frequency (RF) transceiver components for accessing wireless voice and/or data networks (e.g., using cellular telephone technology, advanced data network technology such as 3G, 4G or EDGE, WiFi (IEEE 802.11 family standards, or other mobile communication technologies, or any combination thereof), GPS receiver components, and/or other components. In some embodiments, network interface 135 can provide wired network connectivity (e.g., Ethernet) in addition to or instead of a wireless interface. Network interface 135 can be implemented using a combination of hardware (e.g., antennas, modulators/demodulators, encoders/decoders, and other analog and/or digital signal processing circuits) and software components.

Bus 140 can include various system, peripheral, and chipset buses that communicatively connect the numerous internal devices of computing system 100. For example, bus 140 can communicatively couple processing unit(s) 105 with storage subsystem 110. Bus 140 also connects to input devices 120 and display 125. Bus 140 also couples computing system 100 to a network through network interface 135. In this manner, computing system 100 can be a part of a network of multiple computer systems (e.g., a local area network (LAN), a wide area network (WAN), an Intranet, or a network of networks, such as the Internet. Any or all components of computing system 100 can be used in conjunction with the invention.

A camera 145 also can be coupled to bus 140. Camera 145 can be mounted on a side of computing system 100 that is on the opposite side of the mobile device as display 125. Camera 145 can be mounted on the "back" of such computing system 100. Thus, camera 145 can face in the opposite direction from display 125.

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter.

Through suitable programming, processing unit(s) 105 can provide various functionality for computing system 100. For example, processing unit(s) 105 can execute a tap-detecting operating system. In some embodiments, the tap-detecting operating system is a software-based process that can determine whether any surface of computing system 100 has been tapped, and can perform responsive actions, such as the manipulation of user interface elements shown on display 125, in response.

It will be appreciated that computing system 100 is illustrative and that variations and modifications are possible. Computing system 100 can have other capabilities not specifically described here (e.g., mobile phone, global positioning system (GPS), power management, one or more cameras, various connection ports for connecting external devices or accessories, etc.). Further, while computing system 100 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Moving a Virtual Object Based on Tapping

Figure 2A:
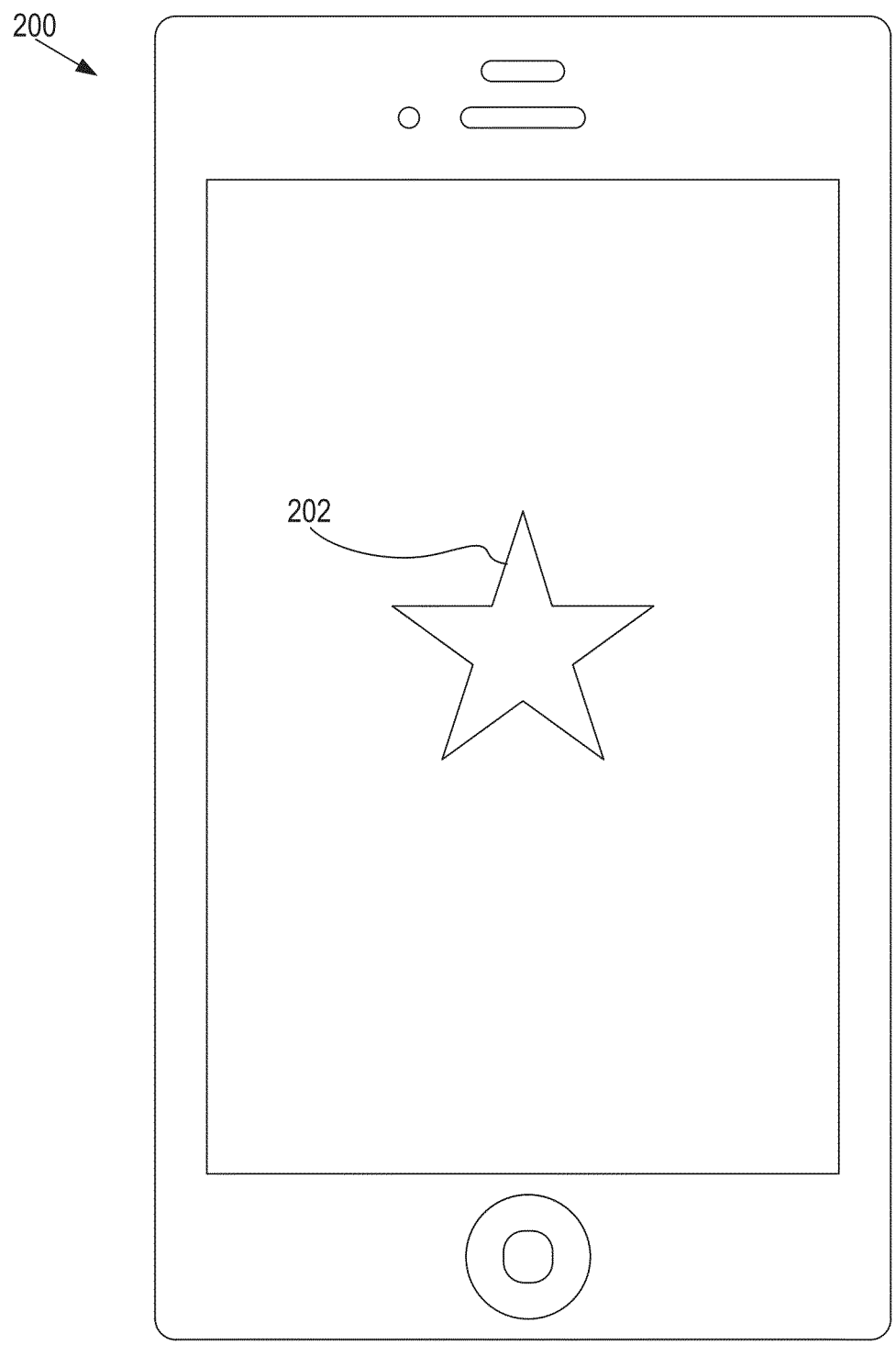
FIG. 2A is a block diagram illustrating an example of a mobile device that can display a virtual object, according to an embodiment of the invention.

FIG. 2A is a block diagram illustrating an example of a mobile device 200 that can display a virtual object, according to an embodiment of the invention. Mobile device 200 can be a smart phone such as an Apple iPhone, for example. Mobile device 200 can have a display that shows virtual object 202 in the relative center of the display, which is considered for purposes of the discussion herein to be on the front surface of mobile device 200. Virtual object 202 can be made up of a set of pixels configured in a customized manner. Although FIG. 2A illustrates only a single virtual object on the display of mobile device 200, in various embodiments of the invention, the display can portray multiple separate virtual objects at various different locations. In such embodiments, a user of mobile device 200 can touch a particular one of the several concurrently displayed virtual objects in order to cause that particular virtual object to become the currently selected virtual object. As will be seen from the discussion below, the application of physical force, such as fingertip-tapping, to various surfaces of mobile device 200 can cause mobile device 200 to move the currently selected virtual object (e.g., virtual object 202) in directions determined based on the surface to which the physical force has been applied. More specifically, in an embodiment of the invention, the direction in which mobile device 200 moves the currently selected virtual object can be the direction in which the force is applied, or, in other words, in a direction toward a surface opposite the surface to which the force was applied. However, in alternative embodiments of the invention, the currently selected virtual object can be moved in other directions in response to the application of the force; the currently selected virtual object can even be moved toward the surface to which the force was applied.

Figure 2B:
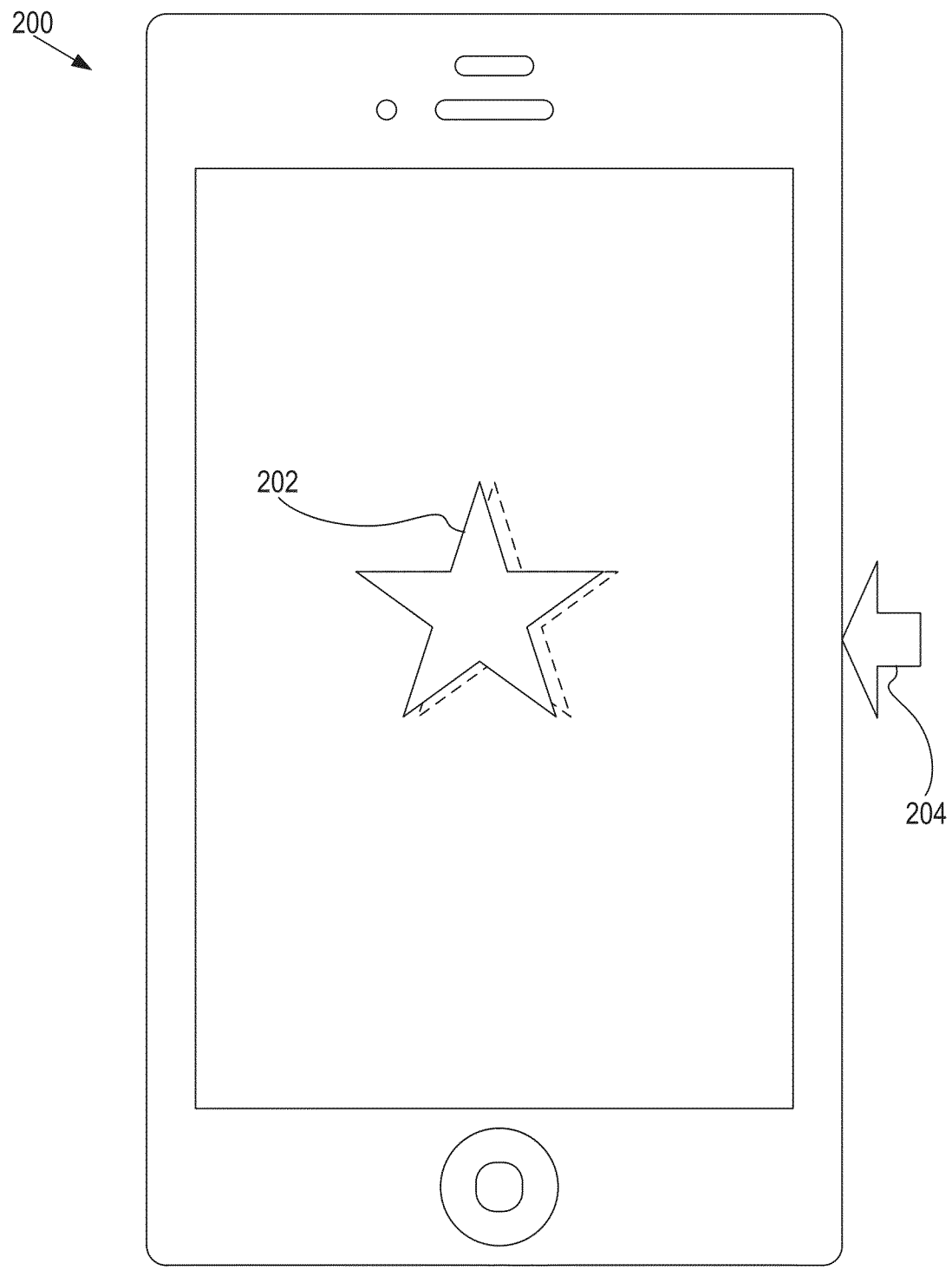
FIG. 2B is a block diagram illustrating an example of a mobile device that can move a virtual object leftward in response to a tapping against the device's right side, according to an embodiment of the invention.

FIG. 2B is a block diagram illustrating an example of a mobile device 200 that can move a virtual object leftward in response to a tapping against the device's right side, according to an embodiment of the invention. As illustrated, a physical force 204 can be applied to the right side surface of mobile device 200. The physical force can be produced by the user of mobile device 200 tapping a fingertip (or several fingertips) against the right side of mobile device 200, for example. Physical force 204 can have both a direction and a magnitude. In this example, the direction is leftward. The magnitude can be dependent on how hard the user taps the surface. It should be noted that, in an embodiment, the tapped surface is not, and does not include any part of, the touchscreen display of mobile device 200. In an embodiment of the invention, an internal accelerometer of mobile device 200 can detect the direction and magnitude of physical force 204.

As shown in FIG. 2B, in response to physical force 204 being applied to the right side surface of mobile device 200, mobile device 200 can move virtual object 202 leftward on its display from its previous position. Thus, in response to physical force 204 being applied to the right side surface of mobile device 200, mobile device 200 moves virtual object 202 away from the right side surface toward the left side surface. In an embodiment of the invention, mobile device 200 can move virtual object 202 a specified distance (e.g., 1 pixel) from its previous position. However, in an alternative embodiment of the invention, mobile device 200 can determine the distance from which virtual object 202 is to be moved from its previous position based at least in part on the magnitude of physical force 204. In such an embodiment, the distance that mobile device 200 moves virtual object 202 away from its previous position increases proportionately to the strength of physical force 204. A relatively light tap can cause mobile device 200 to move virtual object 202 leftward by a relatively slight amount (e.g., 1 pixel), while a relatively heavy tap can cause mobile device 200 to move virtual object 202 leftward by a relatively large amount (e.g., 5 pixels).

Figure 2C:
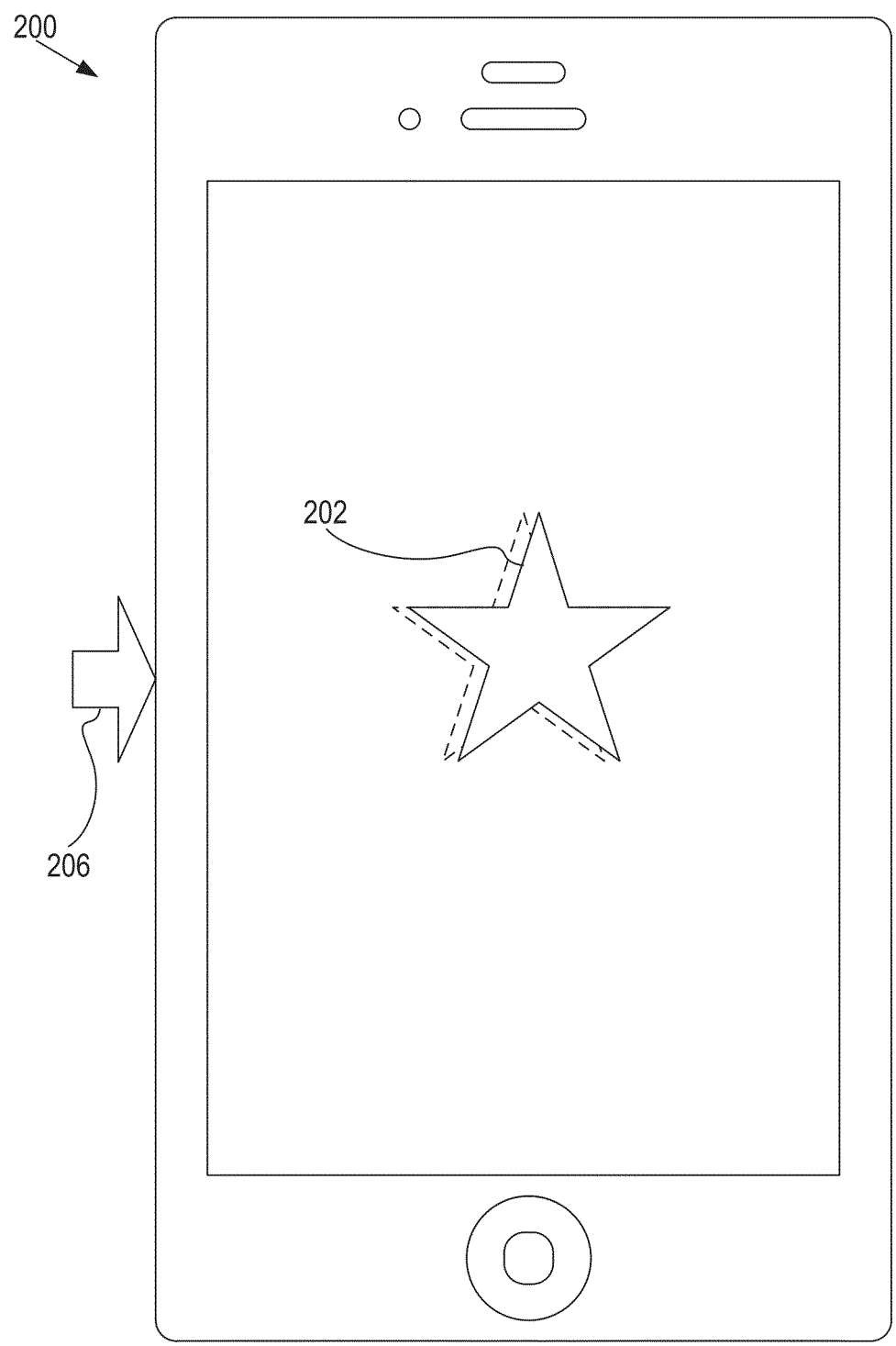
FIG. 2C is a block diagram illustrating an example of a mobile device that can move a virtual object rightward in response to a tapping against the device's left side, according to an embodiment of the invention.

FIG. 2C is a block diagram illustrating an example of a mobile device 200 that can move a virtual object rightward in response to a tapping against the device's left side, according to an embodiment of the invention. As illustrated, a physical force 206 can be applied to the left side surface of mobile device 200. The physical force can be produced by the user of mobile device 200 tapping a fingertip (or several fingertips) against the left side of mobile device 200, for example. Physical force 206 can have both a direction and a magnitude. In this example, the direction is rightward. The magnitude can be dependent on how hard the user taps the surface. It should be noted that, in an embodiment, the tapped surface is not, and does not include any part of, the touchscreen display of mobile device 200. In an embodiment of the invention, an internal accelerometer of mobile device 200 can detect the direction and magnitude of physical force 206.

As shown in FIG. 2C, in response to physical force 206 being applied to the left side surface of mobile device 200, mobile device 200 can move virtual object 202 rightward on its display from its previous position. Thus, in response to physical force 206 being applied to the left side surface of mobile device 200, mobile device 200 moves virtual object 202 away from the left side surface toward the right side surface. In an embodiment of the invention, mobile device 200 can move virtual object 202 a specified distance (e.g., 1 pixel) from its previous position. However, in an alternative embodiment of the invention, mobile device 200 can determine the distance from which virtual object 202 is to be moved from its previous position based at least in part on the magnitude of physical force 206. In such an embodiment, the distance that mobile device 200 moves virtual object 202 away from its previous position increases proportionately to the strength of physical force 206. A relatively light tap can cause mobile device 200 to move virtual object 202 rightward by a relatively slight amount (e.g., 1 pixel), while a relatively heavy tap can cause mobile device 200 to move virtual object 202 rightward by a relatively large amount (e.g., 5 pixels).

In the discussion of FIGS. 2B and 2C above, techniques for moving virtual object 202 leftward or rightward, respectively, in response to physical forces applied to the right and left sides, respectively, of mobile device 200 are described. However, embodiments of the invention are not limited to leftward and rightward movements of virtual objects. In various embodiments of the invention, a physical force applied to the top surface of mobile device 200 can cause mobile device 200 to move virtual object 202 downward toward the bottom surface of mobile device 200, and, conversely, a physical force applied to the bottom surface of mobile device 200 can cause mobile device 200 to move virtual object 202 upward toward the top surface of mobile device 200, where the front surface of mobile device 200 is considered to contain the touchscreen display. In certain embodiments of the invention, a physical force applied to the back surface of mobile device 200 can cause mobile device 200 to perform some specified action relative to virtual object 202 also.

Figure 3:
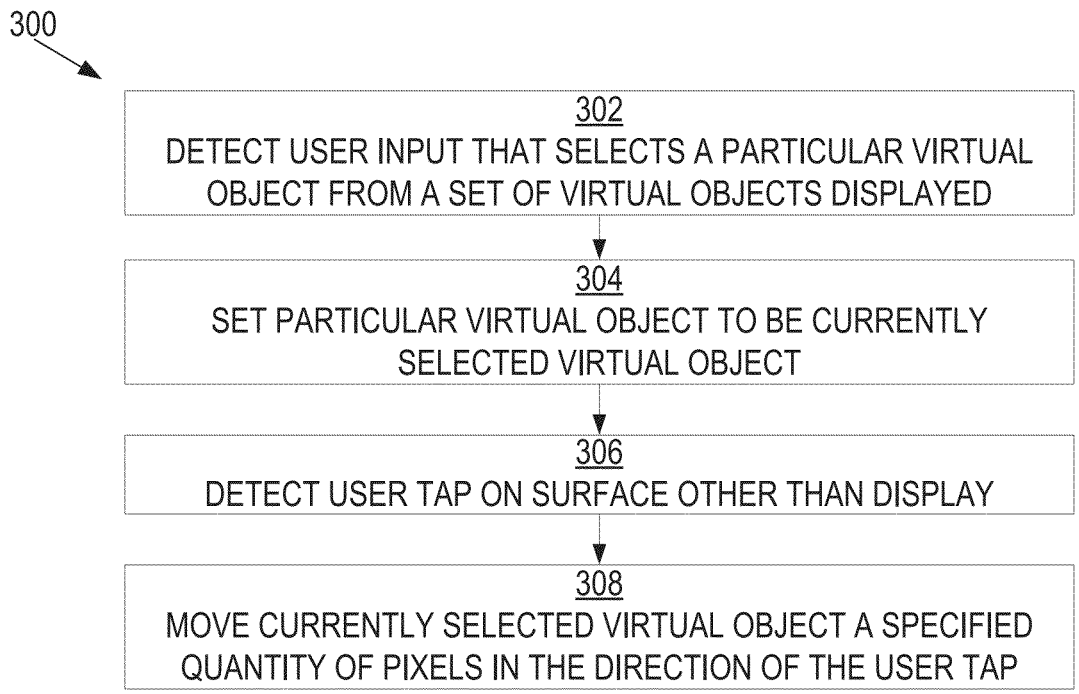
FIG. 3 is a flow diagram illustrating an example of a technique for moving a virtual object on a mobile device's display in response to the detection of a physical force applied to a surface of the mobile device other than the surface on which the display is visible, according to an embodiment of the invention.

FIG. 3 is a flow diagram illustrating an example of a technique 300 for moving a virtual object on a mobile device's display in response to the detection of a physical force applied to a surface of the mobile device other than the surface on which the display is visible, according to an embodiment of the invention. For example, technique 300 can be performed by mobile device 200 of FIGS. 2A-2C, or, more specifically, by an operating system executing on mobile device 200 in conjunction with hardware components that detect motion and send signals to that operating system. Although certain operations are described as being performed in a certain order in technique 300, alternative embodiments of the invention can involve similar techniques being performed with fewer, additional, or different operations, and/or with those operations being performed in a different order.

In block 302, a mobile device detects user input that selects a particular virtual object from a set of multiple virtual objects concurrently shown on its display. For example, the mobile device can detect that a user has touched a region of the mobile device's touchscreen that mostly or completely contains pixels belonging to the particular virtual object.

In block 304, in response to detecting the user input, the mobile device sets the particular virtual object to be the currently selected virtual object. In an embodiment of the invention, the mobile device optionally can detect further touchscreen-based user input relative to the particular virtual object and can manipulate the display of the particular virtual object accordingly. For example, the mobile device can detect that the user has moved his fingertip across the touchscreen some distance in some direction, and can responsively move the particular virtual object along the display concordantly, roughly tracking the movement of the user's fingertip. Typically, such touchscreen-based movements will be at a relatively coarse level of precision, and not highly suited for operations that require refined motions.

In block 306, the mobile device can detect a user tap on a surface of the mobile device other than its display. For example, if the mobile device is a smart phone, then the smart phone can detect that the smart phone's user has tapped his fingers against a side, top, or bottom of a smart phone. The mobile device can detect that the tap has a particular direction and a particular magnitude of force. The direction of the tap is against, or into, the surface on which the tap is administered. The mobile device can use a built-in accelerometer to detect the direction and the magnitude of the force of the tap.

In block 308, in response to detecting the user tap, the mobile device can move the currently selected virtual object a specified quantity of pixels in the direction of the tap. The quantity of pixels can be a fixed quantity, and can be smaller (e.g., 1 pixel) than the granularity with which the selected virtual object could have been moved via user gestures made relative to the mobile device's touchscreen. Alternatively, the quantity of pixels with which the virtual object is moved can be based on the detected magnitude of the force of the tap, such that greater magnitudes produce movements of a larger quantity of pixels and lesser magnitudes produce movements of a lesser quantity of pixels. As is noted above, in an alternative embodiment of the invention, the currently selected virtual object can be moved in a direction other than the direction of the tap (e.g., toward the surface that was tapped).

In an embodiment of the invention, an accelerometer of a mobile device can detect that the mobile device has been impacted on a particular side. A displayed item can be moved in response to the accelerometer detecting that the device has been impacted on the particular side. In an embodiment, the displayed item can be moved away from a source of the impact. In an embodiment, the displayed item can be moved by a single pixel. In an embodiment, the displayed item is a currently selected item among a plurality of displayed items, and the selected item can be moved without moving any other displayed items of the plurality of displayed items. In an embodiment, the displayed item can be moved by a quantity of pixels that is based on a force of the impact.

In an embodiment of the invention, contact against a non-display surface of a mobile device having a plurality of non-display surfaces can be detected. The mobile device can produce output that is based on which particular non-display surface of the plurality of non-display surfaces was contacted. In an embodiment, the mobile device can modify a visual presentation based on which particular non-display surface of the plurality of non-display surfaces was contacted. In an embodiment, the mobile device can produce output that is indicative of which of the particular non-display surfaces was contacted. In an embodiment, the mobile device can produce output that is indicative of a magnitude of a force with which the particular non-display surface was contacted. In an embodiment, the mobile device can move an item in a direction opposing the particular non-display surface.

In an embodiment of the invention, a computing device can detect contact against a surface that lacks a visual output device. The computing device can detect the duration of the contact. The computing device can modify, in a manner that is based on the duration of the contact, output that is produced by the visual output device. In an embodiment, the computing device can determine whether the duration is less than a specified threshold, and can modify the output in response to a determination that the duration is less than the specified threshold. In an embodiment, the computing device can move a displayed item on the visual output device in response to a determination that the duration is less than the specified threshold. In an embodiment, the computing device can move an item away from the surface in response to a determination that the duration is less than the specified threshold. In an embodiment, the computing device can further detect contact against a second surface. The computing device can move, in response to the detection of contact against the second surface, a displayed item in a direction that differs from a direction in which the displayed item was previously moved in response to the previous detection of contact.

In an embodiment of the invention, a mobile device includes a tap-detecting module that is capable of detecting a user tap against a part of the mobile device other than a touchscreen of the mobile device. The mobile device can also include a direction-detecting module that is capable of detecting a direction in which the user tap was administered. The mobile device can also include an output-modifying module that is capable of modifying output presented by the touchscreen based on the direction. Such modules can include accelerometers, displays, and other sensors, for example. Such modules can be implemented via a combination of hardware and software. In an embodiment, the mobile device can include a magnitude-detecting module that is capable of detecting a magnitude of a force of the user tap. The mobile device can include an output-modifying module that is capable of modifying output presented by the touchscreen based on the magnitude. In an embodiment, the mobile device can include an item-moving module that is capable of moving an item displayed by the touchscreen by a specified quantity of pixels in the direction. In an embodiment, the mobile device can include a magnitude-detecting module that is capable of detecting a magnitude of a force of the user tap. The mobile device can include an item-moving module that is capable of moving an item displayed by the touchscreen by a quantity of pixels that is based on the magnitude. In an embodiment of the invention, the mobile device can include a tap-detecting module that is capable of detecting a second user tap against a second part of the mobile device other than the touchscreen and other than the previously tapped part of the mobile device. The mobile device can include a direction-detecting module that is capable of detecting a second direction in which the second user tap was administered. The mobile device can include an item-moving module that is capable of moving an item presented on the touchscreen in the second direction, which can be different from the direction in which the item was moved in response to the detection of the previous user tap.

Modifying a Selection Based on Tapping

Figure 4:
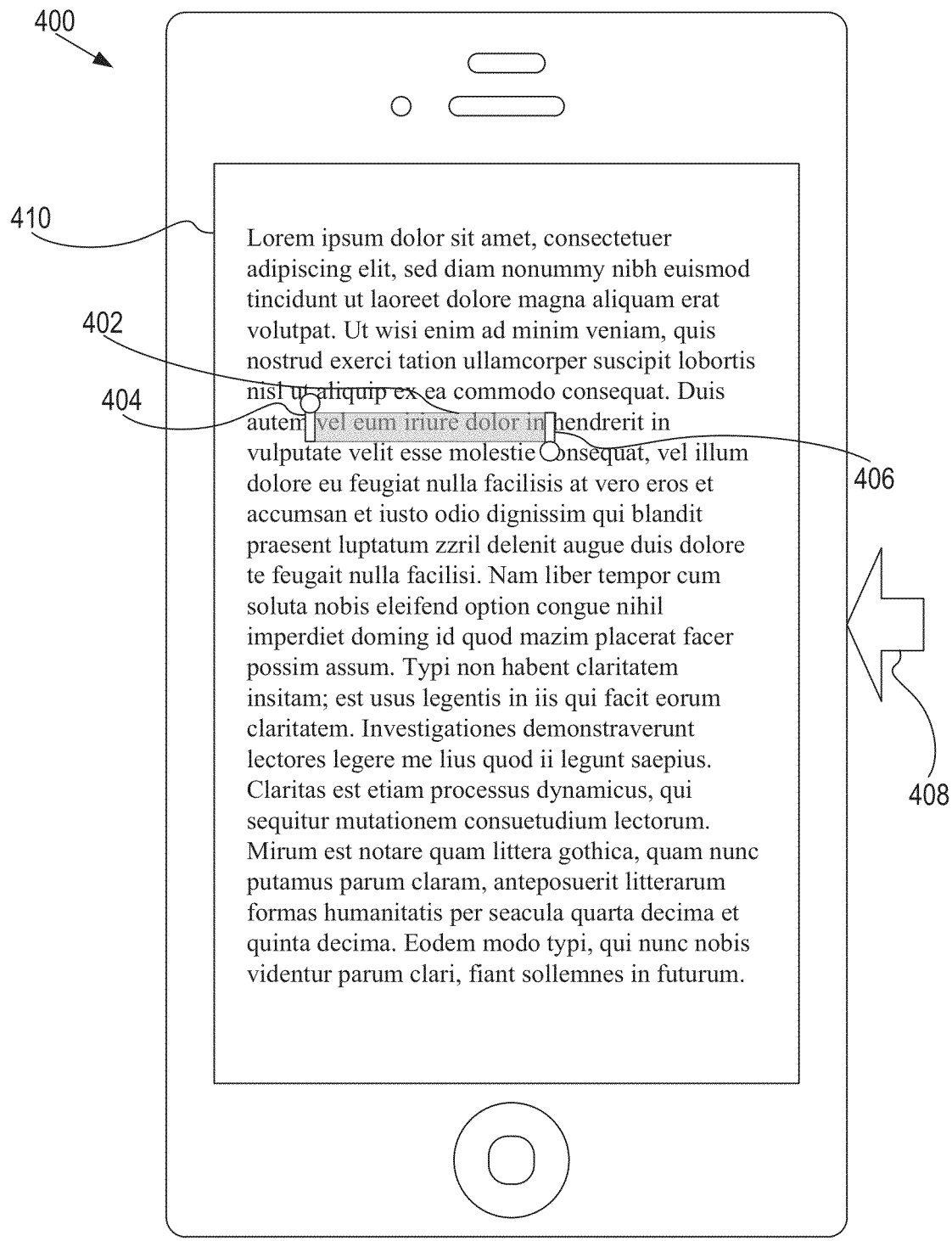
FIG. 4 is a block diagram illustrating an example of a mobile device that can modify a current selection of text, according to an embodiment of the invention.

FIG. 4 is a block diagram illustrating an example of a mobile device 400 that can modify a current selection of text, according to an embodiment of the invention. Mobile device 400 can be a smart phone such as an Apple iPhone, for example. Mobile device 400 can include, on its front surface, a touchscreen display that shows contiguous elements such as text characters in a string of text characters. For example, mobile device 400 can display text 410. By touching and holding down his finger on the touchscreen, a user of mobile device 400 can cause a string of characters 402 (specifically, characters proximate to the location of touch) within text 410 to become currently selected. Although characters are discussed in the present example, other elements, such as other kinds of symbols or objects, alternatively can be presented and selected. Currently selected characters 402 can be bounded by a leftmost selection boundary 404 and a rightmost selection boundary 406. In an embodiment, characters in between leftmost selection boundary 404 and rightmost selection boundary 406 are included within currently selected characters 402, while characters that are not in between selection boundaries 404 and 406 are excluded from currently selected characters 402.

After causing the initial establishment of the selection scope of currently selected characters 402 in the manner discussed above, a user can manually modify that scope by touch-selecting one of selection boundaries 404 and 406, thereby causing that particular selection boundary to become the currently active selection boundary, and then touch-dragging that currently active selection boundary in a direction to place that currently active selection boundary at a different location within text 410. As the currently active selection boundary is being repositioned, additional or fewer characters can be included within or excluded from currently selected characters 402, depending on where the active selection boundary is moved relative to its original position within text 410. Thus, the scope of currently selected characters 402 can be modified using this touch-and-drag technique. However, if the characters are small, making a precise selection using this touch-and-drag technique can be difficult; it can be difficult for a user to expand or contract the scope of currently selected characters 402 by a single character, for example.

Thus, in an embodiment of the invention, a technique is provided whereby user tap input can be used to finely and precisely expand or contract the scope of currently selected characters 402. In one embodiment, after a user has designated one of selection boundaries 404 and 406 to be the currently active selection boundary by touching that selection boundary, mobile device 400 can detect a user tap or other impact relative to a side of mobile device 400. For example, an accelerometer within mobile device 400 can detect user tap input 408 against the right side of mobile device 400. In response to detecting user tap input 408, mobile device 400 can determine a direction and a magnitude of the force of user tap input 408. In the present example, user tap input is applied to the right side of mobile device 400, thereby making the direction of user tap input 408 a leftward direction. In an embodiment, mobile device 400 can respond to the detection of user tap input 408 by moving the currently active selection boundary in the direction indicated by user tap input 408 by a fine granularity, such as one character, or one element of whatever set of contiguous elements are contained within the selection scope.

For example, if leftmost selection boundary 404 is the currently active selection boundary, then user tap input 408 can cause leftmost selection boundary 404 to move leftward by a single character, thus causing the selection scope of currently selected characters 402 to expand to include the character that was located immediately to the left of the previous selection scope within text 410. For another example, if rightmost selection boundary 406 is the currently active selection boundary, then user tap input 408 can cause rightmost selection boundary 406 to move leftward by a single character, thus causing the selection scope of currently selected characters 402 to contract to exclude the previously selected character that was located at the right edge of the previous selection scope within text 410. In one embodiment, the detection of user tap input 408 while neither of selection boundaries 404 and 406 is designated as the currently active selection boundary can cause mobile device 400 to move both selection boundaries 404 and 406 in the direction of user tap input 408 by a single character, thus behaving in a manner similar to that discussed above except as though both of selection boundaries 404 and 406 were concurrently designated to be currently active selection boundaries.

Figure 5:
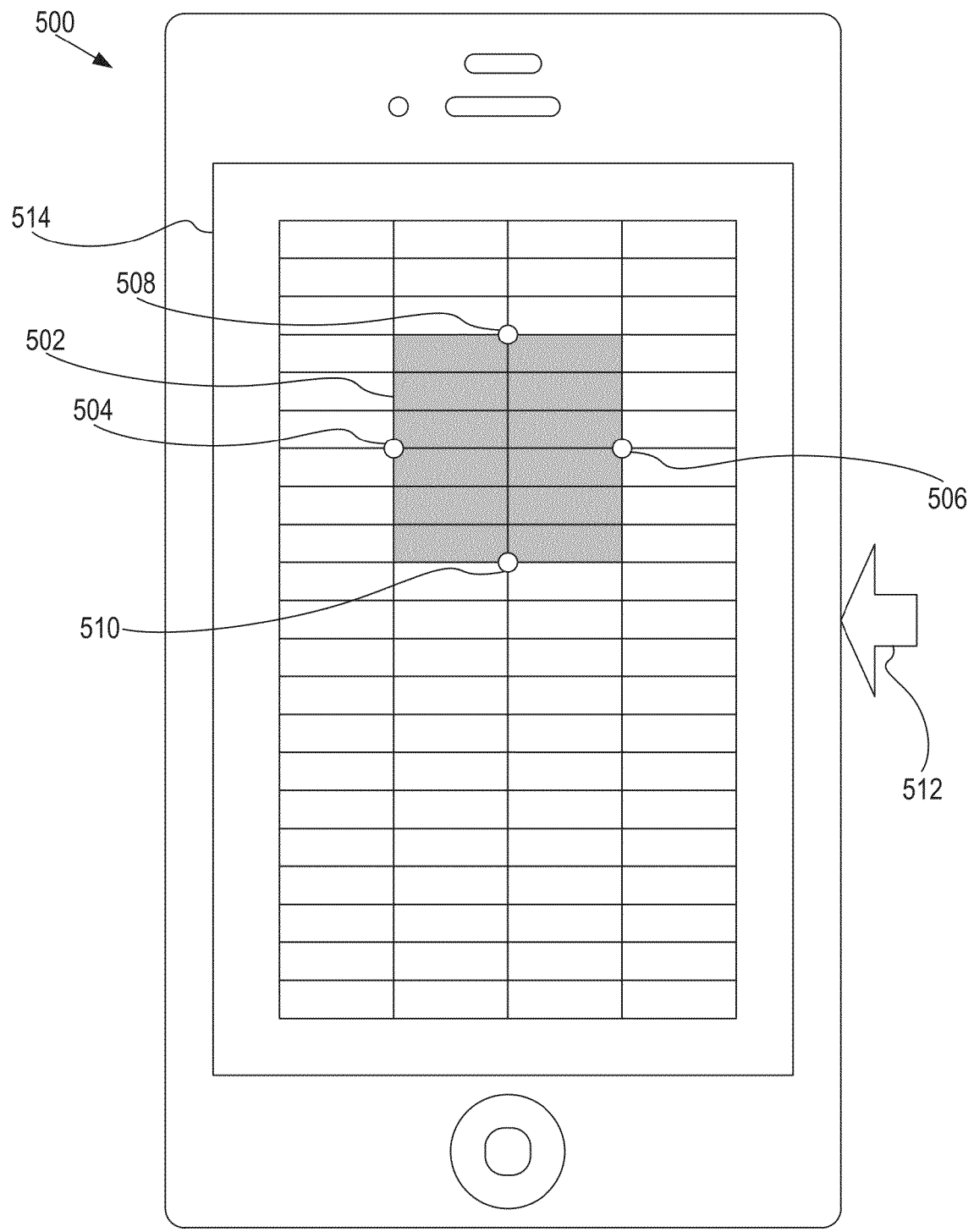
FIG. 5 is a block diagram illustrating an example of a mobile device that can modify a current selection of spreadsheet cells, according to an embodiment of the invention.

FIG. 5 is a block diagram illustrating an example of a mobile device 500 that can modify a current selection of spreadsheet cells, according to an embodiment of the invention. Mobile device 500 can be a smart phone such as an Apple iPhone, for example. Mobile device 500 can include, on its front surface, a touchscreen display that shows contiguous elements such as spreadsheet cells in a matrix of spreadsheet cells. For example, mobile device 500 can display matrix 514. By touching and holding down his finger on the touchscreen, a user of mobile device 500 can cause a block of cells 502 (specifically, cells proximate to the location of touch) within matrix 514 to become currently selected. Although cells are discussed in the present example, other elements, such as other kinds of symbols or objects, alternatively can be presented and selected. Currently selected cells 502 can be bounded by a leftmost selection boundary 504, a rightmost selection boundary 506, a topmost selection boundary 508, and a bottommost selection boundary 510. In an embodiment, cells falling within the rectangle defined by selection boundaries 504, 506, 508, and 510 are included within currently selected cells 502, while cells that do not fall within the rectangle defined by selection boundaries 504, 506, 508, and 510 are excluded from currently selected cells 502.

After causing the initial establishment of the selection scope of currently selected cells 502 in the manner discussed above, a user can manually modify that scope by touch-selecting one of selection boundaries 504, 506, 508, and 510, thereby causing that particular selection boundary to become the currently active selection boundary, and then touch-dragging that currently active selection boundary in a direction to place that currently active selection boundary at a different location within matrix 514. As the currently active selection boundary is being repositioned, additional or fewer vectors of cells can be included within or excluded from currently selected cells 502, depending on where the active selection boundary is moved relative to its original position within matrix 514. Thus, the scope of currently selected cells 502 can be modified using this touch-and-drag technique. However, if the cells are small, making a precise selection using this touch-and-drag technique can be difficult; it can be difficult for a user to expand or contract the scope of currently selected cells 502 by a vector (i.e., row or column) of cells, for example.

Thus, in an embodiment of the invention, a technique is provided whereby user tap input can be used to finely and precisely expand or contract the scope of currently selected cells 502. In one embodiment, after a user has designated one of selection boundaries 504, 506, 508, and 510 to be the currently active selection boundary by touching that selection boundary, mobile device 500 can detect a user tap or other impact relative to a side of mobile device 500. For example, an accelerometer within mobile device 500 can detect user tap input 512 against the right side of mobile device 500. In response to detecting user tap input 512, mobile device 500 can determine a direction and a magnitude of the force of user tap input 512. In the present example, user tap input is applied to the right side of mobile device 500, thereby making the direction of user tap input 512 a leftward direction. In an embodiment, mobile device 500 can respond to the detection of user tap input 512 by moving the currently active selection boundary in the direction indicated by user tap input 512 by a fine granularity, such as one cell or cell vector (i.e., column or row), or one element of whatever set of contiguous elements are contained within the selection scope.

For example, if leftmost selection boundary 504 is the currently active selection boundary, then user tap input 512 can cause leftmost selection boundary 504 to move leftward by a single cell, thus causing the selection scope of currently selected cells 502 to expand to include the column of cells that was located immediately to the left of the previous selection scope within matrix 514. For another example, if rightmost selection boundary 506 is the currently active selection boundary, then user tap input 512 can cause rightmost selection boundary 506 to move leftward by a single cell, thus causing the selection scope of currently selected cells 502 to contract to exclude the previously selected column of cells that was located at the right edge of the previous selection scope within matrix 514. Similar corresponding directionally appropriate behaviors can be performed in response to the receipt of user tap input under circumstances in which topmost selection boundary 508 or bottommost selection boundary 510 is designated to be the currently active selection boundary; under such circumstances, user tap input detected relative to the top and bottom surfaces of mobile device 510 can cause different rows of cells to become included or excluded within currently selected cells 502. In one embodiment, the detection of user tap input 512 while none of selection boundaries 504, 506, 508, and 510 is designated as the currently active selection boundary can cause mobile device 500 to move two of selection boundaries 504, 506, 508, and 510 (depending on the axis against which the user tap is administered) in the direction of user tap input 512 by a single cells, thus behaving in a manner similar to that discussed above except as though two of selection boundaries 504, 506, 508, and 510 (depending on the axis against which the user tap is administered) were concurrently designated to be currently active selection boundaries.

Figure 6:
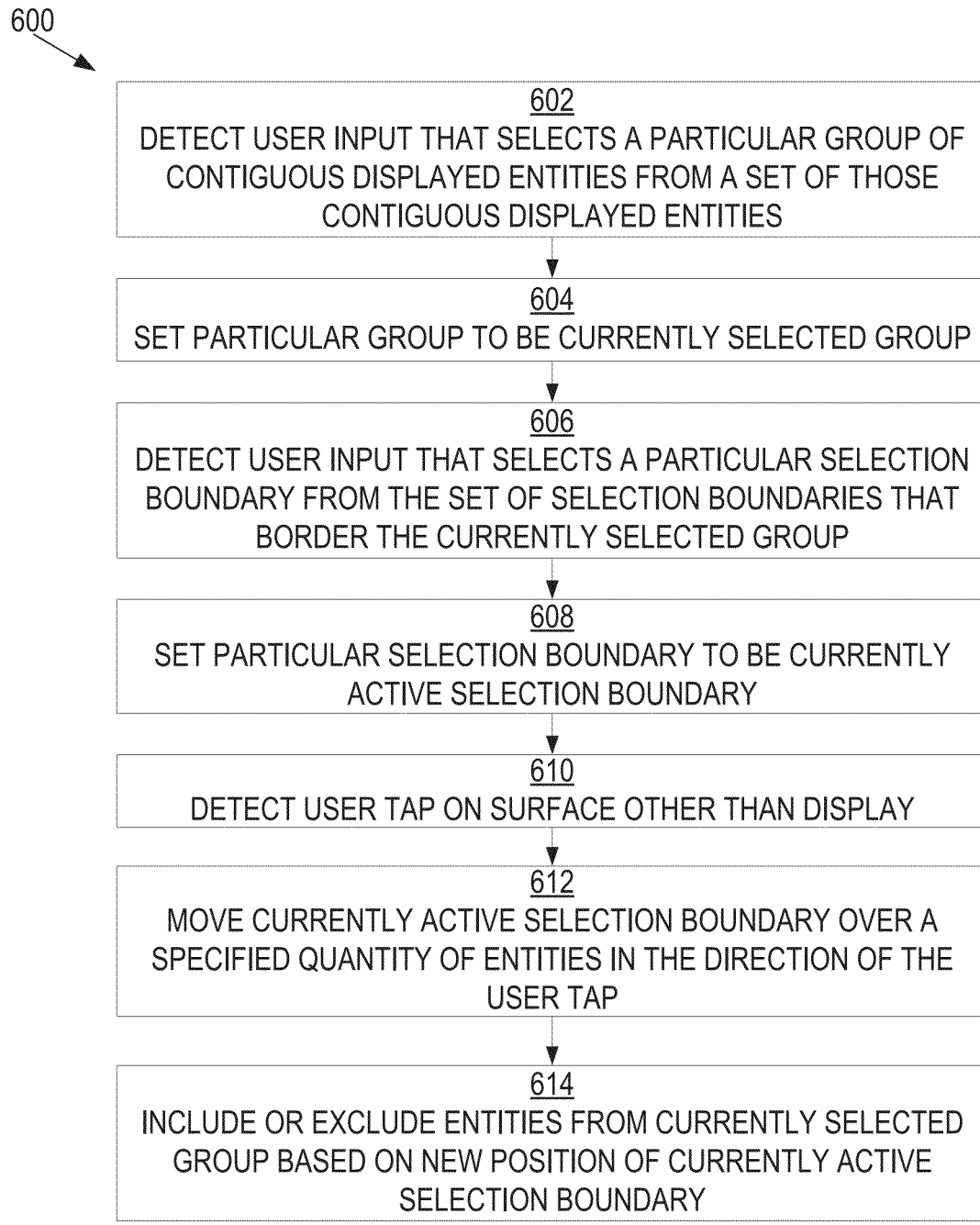
FIG. 6 is a flow diagram illustrating an example of a technique for modifying a selection of a group of contiguous entities on a mobile device's display in response to the detection of a physical force applied to a surface of the mobile device other than the surface on which the display is visible, according to an embodiment of the invention.

FIG. 6 is a flow diagram illustrating an example of a technique 600 for modifying a selection of a group of contiguous entities on a mobile device's display in response to the detection of a physical force applied to a surface of the mobile device other than the surface on which the display is visible, according to an embodiment of the invention. For example, technique 600 can be performed by mobile device 400 of FIG. 4, mobile device 500 of FIG. 5, or, more specifically, by an operating system executing on such mobile devices in conjunction with hardware components that detect motion and send signals to that operating system. Although certain operations are described as being performed in a certain order in technique 600, alternative embodiments of the invention can involve similar techniques being performed with fewer, additional, or different operations, and/or with those operations being performed in a different order.

In block 602, a mobile device detects user input that selects a particular group of contiguous displayed entities from a set of contiguous displayed entities (e.g., text characters, spreadsheet cells, images, etc.) concurrently shown on its display. For example, the mobile device can detect that a user has touched a region of the mobile device's touchscreen that mostly or completely contains pixels belonging to the entities in the particular group of entities.

In block 604, in response to detecting the user input, the mobile device sets the particular group of contiguous displayed entities to be the currently selected group. In an embodiment of the invention, the mobile device optionally can detect further touchscreen-based user input relative to the particular group of contiguous displayed entities and can manipulate the selection of the particular group accordingly. For example, the mobile device can detect that the user has moved his fingertip across the touchscreen some distance in some direction, and can responsively move a selection boundary of the particular group concordantly, roughly tracking the movement of the user's fingertip. Typically, such touchscreen-based movements will be at a relatively coarse level of precision, and not highly suited for operations that require refined motions.

In block 606, the mobile device detects user input that selects a particular selection boundary from the set of selection boundaries that border the currently selected group. For example, the mobile device can detect that a user has touched leftmost selection boundary 504.

In block 608, in response to detecting the user input, the mobile device sets the particular selection boundary to be the currently active selection boundary. For example, the mobile device can set leftmost selection boundary 504 to be the currently active selection boundary.

In block 610, the mobile device can detect a user tap on a surface of the mobile device other than its display. For example, if the mobile device is a smart phone, then the smart phone can detect that the smart phone's user has tapped his fingers against a side, top, or bottom of a smart phone. The mobile device can detect that the tap has a particular direction and a particular magnitude of force. The direction of the tap is against, or into, the surface on which the tap is administered. The mobile device can use a built-in accelerometer to detect the direction and the magnitude of the force of the tap.

In block 612, in response to detecting the user tap, the mobile device can move the currently active selection boundary over a specified quantity of entities (e.g., text characters, spreadsheet cells, images, etc.) in the direction of the tap. The quantity of entities can be a fixed quantity, and can be smaller (e.g., 1 text character, 1 spreadsheet cell, 1 image, etc.) than the granularity at which the currently active selection boundary could have been moved via user gestures made relative to the mobile device's touchscreen. Alternatively, the quantity of entities over which the currently active selection boundary is moved can be based on the detected magnitude of the force of the tap, such that greater magnitudes produce larger movements of the currently active selection boundary and lesser magnitudes produce lesser movements of the currently active selection boundary.

In block 614, the mobile device can include or exclude entities from the currently selected group based on the new position of the currently active selection boundary. For example, the movement of the currently active selection boundary might cause an additional character to be included within the currently selected group. For another example, the movement of the currently active selection boundary might cause a previously selected character to be excluded from the currently selected group. For another example, the movement of the currently active selection boundary might cause an additional vector (i.e., row or column) of spreadsheet cells to be included within the currently selected group. For another example, the movement of the currently active selection boundary might cause a previously selected vector (i.e., row of column) of spreadsheet cells to be excluded from the currently selected group.

In one embodiment of the invention, a mobile device can receive tap input that is associated with a physical force applied to at least one side of the mobile device. The mobile device can determine a magnitude and a direction of the tap input. The mobile device can modify a scope of currently selected data based on the magnitude and direction of the tap input. In one embodiment, the mobile device can modify the scope of the currently selected data by expanding the scope to include a single character that was adjacent to but not previously contained in the currently selected string of characters, by contracting the scope to exclude a single character that was previously contained at an edge of the currently selected string of characters, by expanding the scope to include a single vector of cells that were adjacent to but not previously contained in the currently selected matrix of cells, or by contracting the scope to exclude a single vector of cells that was previously contained at an edge of the currently selected matrix of cells.

In one embodiment of the invention, an accelerometer of a mobile device can detect that the mobile device has been impacted on a particular side. The mobile device can change a scope of currently selected data in response to the accelerometer detecting that the device has been impacted on the particular side. In one embodiment, the mobile device can expand a boundary of the scope in a direction the points away from a source of the impact. In one embodiment, the mobile device can contract a boundary of the scope in a direction that points away from a source of the impact. In one embodiment, the currently selected data can include a plurality of symbols, and the mobile device can exclude, from the currently selected data, a single selected symbol closest to a boundary of the currently selected data. In one embodiment, the mobile device can include, within the currently selected data, a single non-selected symbol closest to a boundary of the currently selected data. In one embodiment, the mobile device can include or exclude, from the currently selected data, symbols in a quantity that is based on a magnitude of force of the impact.

In one embodiment of the invention, a mobile device can detect user selection of a first selection boundary and user selection of a second selection boundary through a display surface of a mobile device including a plurality of non-display surfaces. The mobile device can detect user selection, through the display surface, of a particular selection boundary from a set comprising the first and second selection boundaries. The mobile device can cause the particular selection boundary to be visually distinguished as a currently selected boundary. The mobile device can detect contact against a non-display surface of the plurality of non-display surfaces. The mobile device can move the currently selected boundary in a direction that is based on which particular non-display surface of the plurality of non-display surfaces was contacted. In an embodiment, the mobile device can move the currently selected boundary without moving any other boundary of the first and second selection boundaries. In one embodiment, the mobile device can expand a scope of currently selected data in response to determining that the particular non-display surface is a rightmost surface and that the currently selected boundary is a leftmost selection boundary. In one embodiment, the mobile device can contract a scope of currently selected data in response to determining that the particular non-display surface is a rightmost surface and that the currently selected boundary is a rightmost selection boundary. In one embodiment, the mobile device can expand a scope of currently selected data in response to determining that the particular non-display surface is a leftmost surface and that the currently selected boundary is a rightmost selection boundary. In one embodiment, the mobile device can contract a scope of currently selected data in response to determining that the particular non-display surface is a leftmost surface and that the currently selected boundary is a leftmost selection boundary. In one embodiment, the mobile device can move the currently selected boundary by an extent that is based on a magnitude of a force with which the particular non-display surface was contacted. In one embodiment, the mobile device can move the currently selected boundary in a direction opposing the particular non-display surface.

In one embodiment of the invention, a computing device can receive input that indicates user selection of a block of contiguous entities within a plurality of contiguous entities. The computing device can produce output that visually distinguishes, through a visual output device, the block of contiguous from a remainder of the plurality of contiguous entities. The computing device can detect a tap against a surface that lacks the visual output device. The computing device can modify the user selection of the block of contiguous entities based on the detection of the tap. In one embodiment, the contiguous entities can be cells within a spreadsheet. In one embodiment, the contiguous entities can be characters within a document. In one embodiment, the plurality of contiguous entities can be configured in a multi-dimensional matrix. In one embodiment, the computing device can expand or contract the block by a single row or a single column of the contiguous entities.

In an embodiment of the invention, a mobile device can include a tap-detecting module that is capable of detecting a user tap against a part of the mobile device other than a touchscreen of the mobile device. The mobile device can also include a direction-detecting module that is capable of detecting a direction in which the user tap was administered. The mobile device can also include a selection-adjusting module that is capable of adjusting selection boundaries around currently selected data based on the direction. Such modules can include accelerometers, displays, and other sensors, for example. Such modules can be implemented via a combination of hardware and software. In one embodiment, the mobile device can include a magnitude-detecting module that is capable of detecting a magnitude of a force of the user tap, and a selection-adjusting module that is capable of adjusting the selection boundaries around the currently selected data based on the magnitude. In one embodiment, the mobile device can include a selection-adjusting module that is capable of adjusting the selection boundaries around the currently selected data by a quantity of entities of the plurality of contiguous entities, where that quantity is based on the magnitude. In one embodiment, the currently selected data can include a plurality of contiguous entities, and the mobile device can include a selection-adjusting module that is capable of adjusting the selection boundaries around the currently selected data by a single entity of the plurality of contiguous entities in the direction.

Fine-Tuning an Operation Based on Tapping

Figure 7:
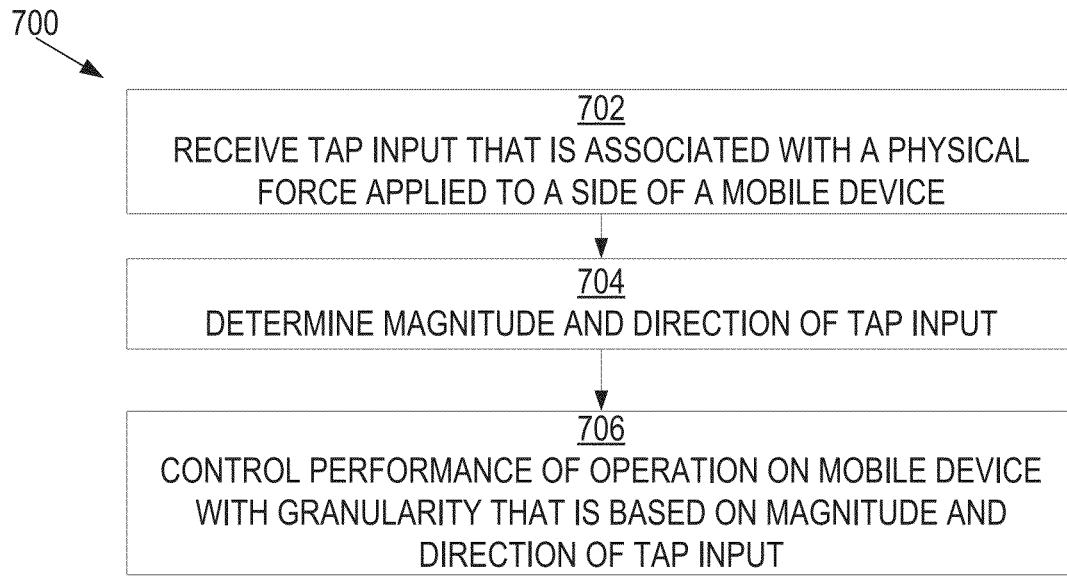
FIG. 7 is a flow diagram illustrating an example of a technique for fine-tuning an operation in response to the detection

FIG. 7 is a flow diagram illustrating an example of a technique 700 for fine-tuning an operation in response to the detection of a physical force applied to a surface of the mobile device other than the mobile device's touchscreen, according to an embodiment of the invention. For example, technique 700 can be performed by mobile device 200 of FIGS. 2A-2C, or, more specifically, by an operating system executing on mobile device 200 in conjunction with hardware components that detect motion and send signals to that operating system. Although certain operations are described as being performed in a certain order in technique 700, alternative embodiments of the invention can involve similar techniques being performed with fewer, additional, or different operations, and/or with those operations being performed in a different order.

In block 702, a mobile device can receive tap input that is associated with a physical force applied to at least one side of the mobile device. In block 704, the mobile device can determine a magnitude and direction of the tap input. In block 706, the mobile device can control the performance of an operation on the mobile device at a particular granularity that is based on the magnitude and direction of the tap input. In other words, the mobile device can control the performance of an operation on the mobile device with a particular degree of precision that is based on the magnitude and direction of the tap input. Significantly, the same operation also can be controllable via input (e.g., touchscreen gestures) other than tap input received through the mobile device, but at a granularity exceeds the particular granularity. That is, the same operation also can be controllable via input (e.g., touchscreen gestures) other than tap input received through the mobile device, but with a degree of precision that is less than the particular degree of precision.

The operation can be any of a variety of different operations. For example, the operation can involve moving an object displayed by the mobile device from one position on the display to another position on the display; more forceful taps can cause the object to move farther. For another example, the operation can involve modifying a scope of currently selected data on the mobile device; a tap in a certain direction can cause the scope to enlarge or decrease in that direction by a distance that is based on the tap's force. For another example, the operation can involve modifying a user-specified image-clipping boundary; a tap in a certain direction can cause an edge of the boundary to move in that direction by a distance that is based on the tap's force. For another example, the operation can involve adjusting a volume setting; the tap's direction can specify whether volume is to be increased or decreased, and the tap's force can specify the extent to which the volume is to be changed. For another example, the operation can involve adjusting a brightness setting of a display; the tap's direction can specify whether brightness is to be increased or decreased, and the tap's force can specify the extent to which the brightness is to be changed. For another example, the operation can involve scrolling content presented on a display; the tap's direction can specify whether the content is to be scrolled up, down, left, or right, and the tap's force can specify the distance with which the content is to be scrolled. For another example, the operation can involve changing a numerical value presented on a display; the tap's direction can specify whether the numerical value is to be increased or decreased, and the tap's force can specify the amount with which the numerical value is to be changed. For another example, the operation can involve selecting a temporal position within a playback of audio data or video data; the tap's direction can specify whether the selected temporal position occurs further forward or further back temporally than the current temporal presentation position (e.g., video frame), and the tap's force can specify the extent to which the selected temporal position is to be moved from the current temporal presentation position.

In one embodiment of the invention, a mobile device can detect motion of the mobile device in a particular direction and at a particular velocity. The mobile device can control a first performance of an operation based on the particular direction and the particular velocity and with a first degree of precision. The mobile device can detect user input through a touchscreen of the mobile device. The mobile device can control a second performance of the operation based on the user input and with a second degree of precision, where the maximum degree of precision with which the operation is controllable by user input detected through the touchscreen is less than the first degree of precision.

In one embodiment of the invention, a mobile device can detect contact against a non-display surface of the mobile device. The mobile device can have several separate such non-display surfaces. The mobile device can control performance of an operation on the mobile device based on which particular non-display surface of the plurality of non-display surfaces was contacted and with a degree of precision that is undetectable by a touchscreen of the mobile device. In one embodiment, the performance of the operation can be indicative of which of the particular non-display surfaces was contacted. In one embodiment, the performance of the operation can be indicative of a magnitude of a force with which the particular non-display surface was contacted.

In one embodiment of the invention, a computing device can detect contact that moves the computing device. The computing device can detect the duration of the contact. The computing device can control performance of an operation with a degree of precision that is based on the duration of the contact and the movement of the computing device.

In one embodiment of the invention, a mobile device can include a tap-detecting mechanism that is capable of detecting a user tap against a part of the mobile device other than a touchscreen of the mobile device. The mobile device can include a magnitude-detecting mechanism that is capable of detecting a magnitude of a force with which the user tap was administered. The mobile device can include an operation-controlling mechanism that is capable of controlling performance of an operation with a degree of precision that is based on the magnitude. Such mechanisms can include accelerometers, displays, and other sensors, for example. Such mechanisms can be implemented via a combination of hardware and software. In one embodiment, the mobile device can include a direction-determining mechanism that is capable of detecting a direction of the user tap, and the operation-controlling mechanism can be capable of controlling performance of the operation based on the direction.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above can make reference to specific hardware and software components, those skilled in the art will appreciate that different combinations of hardware and/or software components can also be used and that particular operations described as being implemented in hardware might also be implemented in software or vice versa.

Computer programs incorporating various features of the present invention can be encoded and stored on various computer readable storage media; suitable media include magnetic disk or tape, optical storage media such as compact disk (CD) or DVD (digital versatile disk), flash memory, and other non-transitory media. Computer readable media encoded with the program code can be packaged with a compatible electronic device, or the program code can be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method, comprising:
at a mobile device with an accelerometer and a plurality of sides, including a side that contains a touch screen display and other sides that do not contain a touch screen display ("non-display sides"):
detecting a finger input on the touch screen display;
in response to detecting the finger input on the touch screen display, controlling an operation on the mobile device with a first degree of precision based on the detected finger input;
detecting a tap input on a non-display side of the mobile device;
determining one or more characteristics of the tap input; and
controlling the operation on the mobile device at a second degree of precision that is based on the one or more characteristics of the tap input;
wherein the second degree of precision exceeds the first degree of precision.

2. The method of claim 1, wherein the second degree of precision for the operation cannot be achieved with finger input on the touch screen display.

3. The method of claim 1, wherein the one or more characteristics of the tap input include a magnitude and a direction of a velocity of the tap input, and the operation comprises moving a displayed item by a quantity of pixels that is based on the magnitude and the direction of the velocity of the tap input.

4. The method of claim 1, wherein the one or more characteristics of the tap input include a magnitude and a direction of a force of the tap input, and the operation comprises moving a displayed item by a quantity of pixels that is based on the magnitude and the direction of the force of the tap input.

5. The method of claim 1, wherein the tap input includes a contact that causes movement of the device, the contact having a duration, and the characteristics of the tap input include the duration of the contact and the movement of the device.

6. The method of claim 1, wherein controlling the operation on the mobile device at the second degree of precision includes moving a displayed item by a single pixel.

7. The method of claim 1, wherein controlling the operation on the mobile device at the second degree of precision includes modifying a parameter with the second degree of precision in response to a determination that a duration of the tap input is less than a specified threshold duration.

8. The method of claim 1, wherein controlling the operation on the mobile device at the second degree of precision includes increasing or decreasing a numerical value presented on the touch screen display of the mobile device.

9. A mobile device comprising:
an accelerometer;
a plurality of sides, including a side that contains a touch screen display and other sides that do not contain a touch screen display ("non-display sides");
one or more processors; and
memory storing one or more programs for execution by the one or more processors, the one or more programs including instructions for:
detecting a finger input on the touch screen display;
in response to detecting the finger input on the touch screen display, controlling an operation on the mobile device with a first degree of precision based on the detected finger input;
detecting a tap input on a non-display side of the mobile device;
determining one or more characteristics of the tap input; and
controlling the operation on the mobile device at a second degree of precision that is based on the one or more characteristics of the tap input;
wherein the second degree of precision exceeds the first degree of precision.

10. The device of claim 9, wherein the second degree of precision for the operation cannot be achieved with finger input on the touch screen display.

11. The device of claim 9, wherein the one or more characteristics of the tap input include a magnitude and a direction of a velocity of the tap input, and the operation comprises moving a displayed item by a quantity of pixels that is based on the magnitude and the direction of the velocity of the tap input.

12. The device of claim 9, wherein the one or more characteristics of the tap input include a magnitude and a direction of a force of the tap input, and the operation comprises moving a displayed item by a quantity of pixels that is based on the magnitude and the direction of the force of the tap input.

13. The device of claim 9, wherein the tap input includes a contact that causes movement of the device, the contact having a duration, and the characteristics of the tap input include the duration of the contact and the movement of the device.

14. The device of claim 9, wherein controlling the operation on the mobile device at the second degree of precision includes moving a displayed item by a single pixel.

15. The device of claim 9, wherein controlling the operation on the mobile device at the second degree of precision includes modifying a parameter with the second degree of precision in response to a determination that a duration of the tap input is less than a specified threshold duration.

16. The device of claim 9, wherein controlling the operation on the mobile device at the second degree of precision includes increasing or decreasing a numerical value presented on the touch screen display of the mobile device.

17. A non-transitory computer-readable storage medium having one or more programs stored thereon for execution by one or more processors of a mobile device with an accelerometer and a plurality of sides, including a side that contains a touch screen display and other sides that do not contain a touch screen display ("non-display sides"), the one or more programs including instructions for:

detecting a finger input on the touch screen display;

in response to detecting the finger input on the touch screen display, controlling an operation on the mobile device with a first degree of precision based on the detected finger input;

detecting a tap input on a non-display side of the mobile device;

determining one or more characteristics of the tap input; and controlling the operation on the mobile device at a second degree of precision that is based on the one or more characteristics of the tap input;

wherein the second degree of precision exceeds the first degree of precision.

18. The computer-readable storage medium of claim 17, wherein the second degree of precision for the operation cannot be achieved with finger input on the touch screen display.

19. The computer-readable storage medium of claim 17, wherein the one or more characteristics of the tap input include a magnitude and a direction of a velocity of the tap input, and the operation comprises moving a displayed item by a quantity of pixels that is based on the magnitude and the direction of the velocity of the tap input.

20. The computer-readable storage medium of claim 17, wherein the one or more characteristics of the tap input include a magnitude and a direction of a force of the tap input, and the operation comprises moving a displayed item by a quantity of pixels that is based on the magnitude and the direction of the force of the tap input.

21. The computer-readable storage medium of claim 17, wherein the tap input includes a contact that causes movement of the device, the contact having a duration, and the characteristics of the tap input include the duration of the contact and the movement of the device.

22. The computer-readable storage medium of claim 17, wherein controlling the operation on the mobile device at the second degree of precision includes moving a displayed item by a single pixel.

23. The computer-readable storage medium of claim 17, wherein controlling the operation on the mobile device at the second degree of precision includes modifying a parameter with the second degree of precision in response to a determination that a duration of the tap input is less than a specified threshold duration.

24. The computer-readable storage medium of claim 17, wherein controlling the operation on the mobile device at the second degree of precision includes increasing or decreasing a numerical value presented on the touch screen display of the mobile device.

* * * * *